United States Patent [19]

Buccilli et al.

[11] Patent Number: 4,890,411
[45] Date of Patent: Jan. 2, 1990

[54] FISH ATTRACTING PELLET

[76] Inventors: Theodore A. Buccilli, 1421 E. Crest Dr., Englewood, Fla. 34223; Frederick G. Hartland, 6423 Brookridge St., Englewood, Fla. 34224

[21] Appl. No.: 242,968

[22] Filed: Sep. 9, 1988

[51] Int. Cl.⁴ ............................................. A01K 85/00
[52] U.S. Cl. .................................................... 43/42.06
[58] Field of Search .................... 43/42, 42.06, 44.99, 43/44.89

[56] References Cited

U.S. PATENT DOCUMENTS

| | | | |
|---|---|---|---|
| 2,874,048 | 9/1956 | Walldov | 43/42.06 |
| 3,410,689 | 11/1968 | Nathan | 43/42.06 |
| 3,605,316 | 2/1969 | Rogers | 43/42.06 |
| 4,050,181 | 9/1977 | Young et al. | 43/42.06 |
| 4,794,720 | 1/1989 | Robertaccio | 43/42 |

*Primary Examiner*—Nicholas P. Godici
*Assistant Examiner*—Michael William Starkweather
*Attorney, Agent, or Firm*—Charles J. Prescott

[57] ABSTRACT

A fishing attracting pellet adapted to be interconnectable to either a continuous length of fishing line or at the end thereof. The pellet is manufactured of either a solidified or plastic, deformable, fish attractant material which is soluble and slowly desolvable in water or of a non-soluble, porous material which will absorb and become impregnated with fish attractant pastes and liquids for later dispersion in water. In one embodiment, a longitudinal aperture is disposed through the pellet to receive the fishing line passed therethrough. The pellet may also include a fish hook whose shank is embedded therein, or a lenght of wire similarly embedded for interconnection to the fishing line and other fishing lures. The invention may further include laterally extending structure for enhanced disbursement of the disolved fish attractant material.

13 Claims, 1 Drawing Sheet

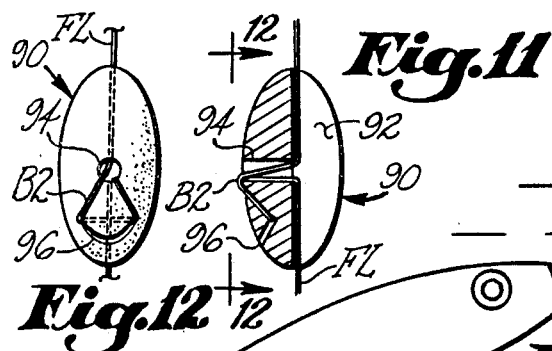
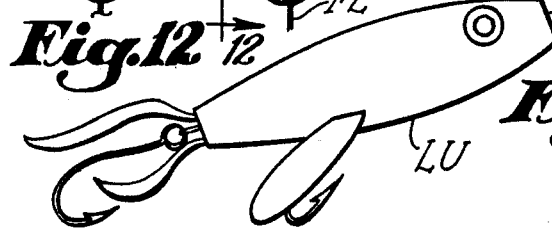
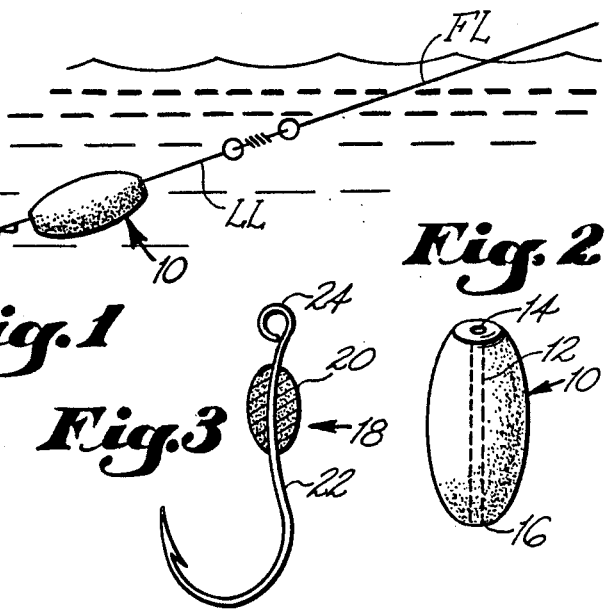
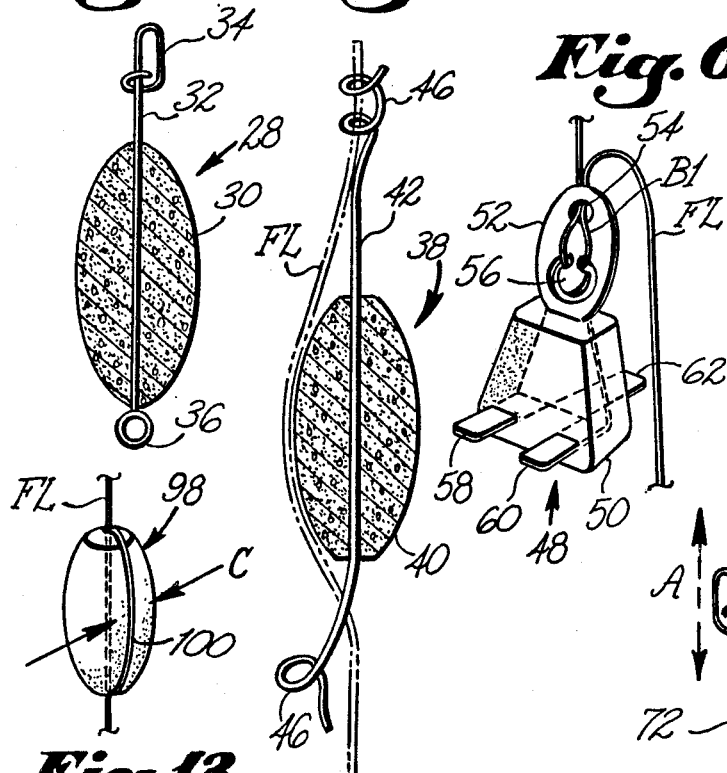
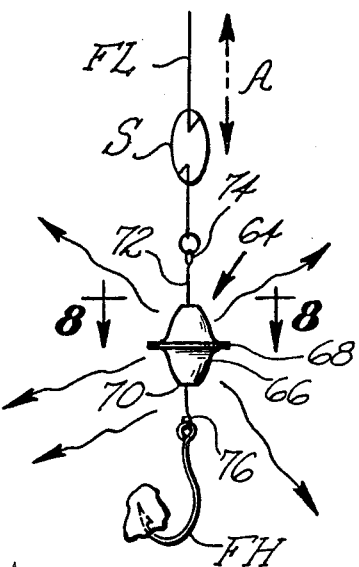
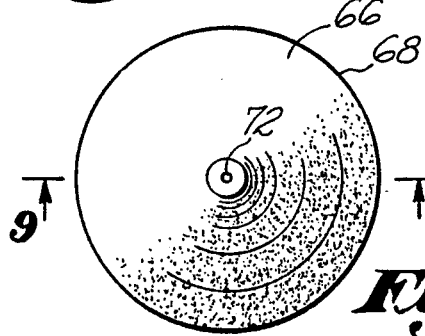
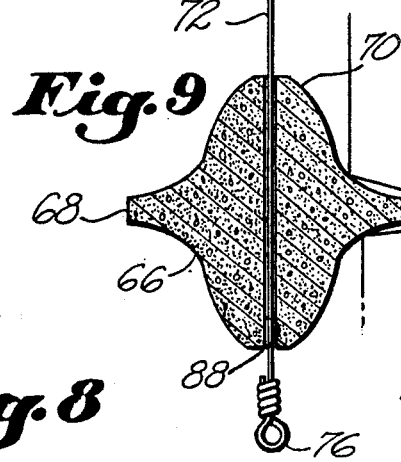
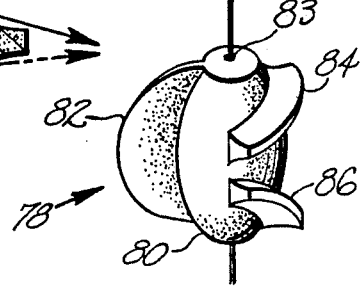

FISH ATTRACTING PELLET

BACKGROUND OF THE INVENTION

This invention relates generally to fish attractants, and more particularly to a fish attractant pellet which is interconnectable either onto a fishing line or between the end of the line and a fishing lure.

Prior art discloses many fishing lures which are structured and adapted to receive a portion of fish attractant or foodstuff material held for disbursing a fish attracting odor into the water as the lure used during fishing. Such references known to applicant are as follows.

| Inventor | U.S. Pat. No. |
| --- | --- |
| Fagg | 2,780,021 |
| Valentine | 3,273,277 |
| Lindenberg | 2,674,0558 |
| Hsu | 4,205,476 |
| Capps | 2,937,467 |
| Pfister | 4,047,317 |
| Balch | 3,688,430 |
| Ferguson et al | 2,983,065 |
| Guindon | 1,673,978 |
| Kurachi | 3,844,060 |
| Hartman et al | 2,639,536 |

All of these inventions include a rigid shell which is openable to receive the fish attractant or foodstuff therein.

Another prior art invention is disclosed in U.S. Pat. No. 3,066,434 to Duller which includes a capsule-type structure manufactured to contain fish attracting liquid or granules. The invention also includes a forwardly pointing secondary hook which pierces the capsule as the capsule is forced rearwardly by water pressure as the invention is pulled through the water. At that point, the fish attractant material is released and disbursed in the water.

Finally, applicant is aware of the invention disclosed in U.S. Pat. No. 3,605,316 to Rogers which is directed to a disc-shaped tablet formed of solidified cottonseed in unique porportions believed to have advantage to the environment as well as in attracting and catching fish.

The present invention is directed to a simplified fish attracting pellet which may have a unique elongated shape and structure to be easily interconnectable between the end of a fishing line and a fishing lure or at the end thereof for use. The invention may also include an embedded fish hook or a length of wire which facilitates interconnection at the end of the fishing line or deformable around any point therealong. Additional structure may also be provided laterally extending from the outer surface of the pellet to enhance the disbursion of the disolved fish attractant material into the water. The material utilized in manufacturing the invention may be in the form of either solidified or deformable fish attractant material or solid, yet porous material which is adapted to absorbedly receive commercially available fish attractant liquid or paste to be repeatedly impregnated therein.

BRIEF SUMMARY OF THE INVENTION

This invention is directed to a fish attracting pellet adapted to be interconnectable onto either a continuous length of fishing line or at the end thereof. The pellet is manufactured of either a solidified or plastic, deformable, fish attractant material, or impregnated therewith, which is soluble and slowly desolvable in water. In several embodiments, a longitudinal aperture is disposed through the pellet to receive the fishing line passed therethrough. The pellet may also include a fish hook whose shank is embedded therein, or a length of wire similarly embedded onto the aperture for interconnection to the fishing line and other lures. The invention may also include laterally extending structure for enhanced disbursement of the disolved fish attractant material.

It is therefore an object of this invention to provide a fish attracting pellet which provides easy and positive interconnection either along the length or at the end of a fishing line.

It is another object of this invention to provide a fish attracting pellet including an embedded fish hook for use.

It is another object of this invention to provide a fish attracting pellet having structure for enhanced disbursement of the dissolved fish attractant material into the water during use.

It is another object of the present invention to provide a fish attractant pellet which is manufactured of a porous material adapted to absorb and then slowly disburse into water commercially available fish attractant pastes and liquids.

In accordance with these and other objects which will become apparent hereinafter, the instant invention will now be described with reference to the accompanying drawings in which:

BRIEF DESCRIPTION OF THE DRAWINGS

FIG. 1 is a pictorial view of one embodiment of the invention in use in conjunction with a conventional fishing lure.

FIG. 2 is a perspective view of the invention as shown in use in FIG. 1.

FIG. 3 is a side elevation partial section view of another embodiment of the invention.

FIG. 4 is a side elevation partial section view of yet another embodiment of the invention.

FIG. 5 is a side elevation partial section view of yet another embodiment of the invention.

FIG. 6 is a perspective view of yet another embodiment of the invention.

FIG. 7 is a pictorial view of yet another embodiment of the invention in use.

FIG. 8 is a view in the direction of arrows 8—8 in FIG. 7.

FIG. 9 is a section view in the direction of arrows 9—9 in FIG. 8.

FIG. 10 is a perspective view of yet another embodiment of the invention.

FIG. 11 is a side elevation section view of yet another embodiment of the invention.

FIG. 12 is a view in the direction of arrows 12—12 in FIG. 11.

FIG. 13 is a perspective view of yet another embodiment of the invention.

DETAILED DESCRIPTION OF THE INVENTION

Referring now to the drawings, and particularly to FIGS. 1 and 2, the preferred embodiment of the invention is shown generally at numeral 10 having a generally oval-shaped body and having an aperture 12 disposed longitudinally therethrough from one end 14 to the other end 16. This aperture 12 is adapted to receive a leader line LL or part of the fishing line FL at the fisherman's choice. This embodiment 10 is preferably to be disposed in front of a fishing lure LU so that the solidified material comprising a scented fish attractant material which is soluble and slowly disolvable in water dissolves away and disburses in the water adjacent and surrounding the fishing lure LU. Such a fish attractant material may be produced from organic materials such as processed fish extracts or other biodegradable substances which carry fish attracting scents accompanied by a binder. Such a fish attractant material, in its solidified form, is used in most embodiments of the invention except that herebelow described as depicted in FIG. 13 and those embodiments manufactured of an insoluble porous material adapted to absorb fish attractant paste and liquid.

In the embodiment 10 of the invention shown in FIGS. 1 and 2, aperture 12 is sized so as to allow the pellet 10 to freely slide over either the leader line LL or fish line FL so as to facilitate its installation thereon.

Referring now to FIG. 3, an alternate embodiment of the invention is shown generally at 18 and includes a pellet 20 manufactured as previously described, except that the shank of fish hook 22 is embedded and secured therein. This well-known structure for fish hook 22 includes eyelet 24 disposed at one end and the curved portion 26 disposed at the other having a barb at the distal end thereof. It is envisioned that this embodiment 18 will be manufactured and sold as a unit, leaving the fish hook 22 for continued use after pellet 20 is finally dissolved away or remaining reusable if pellet 20 is fabricated of fish attractant paste or liquid absorbing porous material.

Referring now to FIG. 4, another alternate embodiment of the invention is shown generally at 28 having pellet 30 structured as previously described. In this embodiment 28, an elongated thin, rigid wire 32 is provided embedded and secured at its mid-section within pellet 30 and having releasable clip 34 disposed at one end and eyelet 36 disposed at the other. This embodiment 28 is provided to be interengageable between the end of a fishing line FL, which may be tied and knotted to eyelet 36, and a fishing lure LU, which may be snapped into place into openable clip 34. When the fish attractant pellet 30 is dissolved, wire 32 is then properly discarded.

Referring to FIG. 5, another alternate embodiment is shown at 38 having fish attractant pellet 40 as previously described. However, in this embodiment 38, a length of malleable deformable thin wire 42 such as copper or aluminum base, is provided embedded and secured at its mid-point longitudinally within pellet 40. This length of deformable wire 42 may then be wrapped around a length of fishing line FL by simply manually wrapping and squeezing the wire 42 at 46 therearound. By this means, then, this embodiment 38 may be secured at any point along the fishing line FL at the user's option and convenience and easily removed therefrom when not desired.

Referring now to FIG. 6, another embodiment is shown generally at 48 which includes fish attractant pellet 50 and also includes thin metal plate 52 embedded at its lower mid-section within pellet 50 as shown. Plate 52 also includes, in its upper end, hole 54 and tang 56 which are arranged such that a bight B1 of the fishing line FL may be passed through hole 54 and around tang 56 so as to releasably interengage plate 52 and pellet 50 to the fishing line FL as shown. The lower end of plate 52 includes laterally disposed tabs 58, 60 and 62 which extend outwardly beyond the surface of pellet 50 and are provided to enhance the disbursement of the fish attractant material which dissolves away from pellet 50 in water. When the fish line FL is displaced during normal fishing activity, then, the tabs 58, 60 and 62 serve to stir the adjacent water, enhancing disbursement of the dissolved fish attractant material.

Referring now to FIGS. 7, 8 and 9, another embodiment of the fish attractant pellet is shown generally at 64 and includes a main pellet body 66 formed of solidified fish attracting material or porous material for absorbing same as previously described. The main body 66 also includes laterally extending and centrally positioned flange 68 formed integral with the main pellet body 66 which also includes a central aperture 88 disposed longitudinally therethrough to slideably receive rigid wire 72 or fishing line FL. Flange 68 is provided so that, when the fishing line FL is displaced up and down in the direction of arrow A, the dissolved fish attracting material is disbursed outwardly in the direction of the arrows into the water and away from the pellet 64. Wire 72, as previously described, also includes openable clip 74 disposed at one end and eyelet 76 disposed at the other for functioning as previously described in conjunction with interconnection to the fishing line FL, and fishing hook FH or fishing lure LU.

Referring now to FIG. 10, another embodiment of the invention is shown generally at 8 and includes a main pellet body 80 and outwardly extending longitudinal fin 82, along with outwardly extending opposing diagonal fins 84 and 86. This embodiment 78 of the invention is, as previously described, fabricated of solidified and scented fish attracting material or porous fish attractant paste or liquid material. Centrally located longitudinal aperture 83 is provided to allow the pellet 78 to be slidably engaged over a fishing line FL. Opposing diagonally disposed fins 84 and 86 are provided extending outwardly as shown from the main pellet body 82 enhance the disbursement of these dissolved fish attractant materials to in a fashion previously described wherein displacement of the pellet 78 by the fishing line FL causes the diagonal fins 84 and 86 passing through the water to stir and force the dissolved fish attractant outwardly away from the pellet 78. Longitudinal fin 82, extending substantially the full length of the main pellet body 80, is provided to stablize the pellet 78 from spinning on fish line FL as the pellet 78 is displaced through the water. Thus, longitudinal fin 82, by preventing rotation of the pellet 78, further enhances the effectiveness and the fish attractant disbursing characteristics of opposing diagonally disposed fins 84 and 86.

Referring now to FIG. 11 and 12, another embodiment of the invention is shown generally at 90 which is, in and of itself, interengagable onto the fishing line FL at any point therealong. This embodiment 90, fabricated of solidified and scented fish attracting or absorbing material as previously described, includes longitudinal groove 92 which extends from the central longitudinal axis of the pellet 92 outwardly to the outer surface thereof and is sized to receive a fishing line FL passed therein. This embodiment 90 also includes a transverse aperture 94 extending from the central margin of groove 92 away therefrom to the opposite surface of the pellet 90 as shown. This aperture 94 is adapted to receive a bight B2 of the fishing line FL passed therethrough. The looped bight B2, having been passed through transverse aperture 94, is then interengagable into diagonal groove 96 which extends inwardly toward, but not to, either the groove 92 or the transverse aperture 94. This diagonal groove 96 then receives the looped end of bight B2 and secures it there when the fishing line FL is pulled taught axially in either direction. Obviously, then, when the pellet 90, fabricated entirely of solidified fish attracting material, is dissolved, no residue is left requiring removal; however, the user may easily and quickly remove the pellet 90 therefrom by reversing the installation process hereabove described.

Referring lastly to FIG. 13, this alternate embodiment is shown generally at 98 and is fabricated of a deformable scented and fish attracting material. This embodiment 98, having longitudinal groove 100 extending to the longitudinal center of the pellet 98, is adapted to receive the fishing line FL inserted therein. Thereafter, by manual exertion of pressure in the direction of arrows C, squeezing the groove 100 closed so as to encapsulate the fishing line therein.

It is again here emphasized that all of the embodiments of the invention described above, including those which are within the scope of this invention, may be fabricated of either solidified or deformable fish attracting material such that when used, the entire structure is ultimately, but slowly, dissolved in water. Alternately, these pellets may be fabricated of a non-soluble material which is inert, but which may be impregnated with fish attracting paste or liquid so as to slowly dissipate this impregnated fish attractant when the pellet is in water. Such a fish attractant liquid is commercially available under the Federally registered trademark FISH FORMULA.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A fish attracting pellet interconnectable to a fishing line, said pellet comprising:
   an elongated main body formed of solidified and scented fish attractant material which is soluble and slowly dissolvable in water;
   said main body having a longitudinal aperture therethrough to receive a fishing line passed therethrough;
   a length of wire embedded and secured within, and extending in either direction from, said aperture;
   said wire having an openable loop at one end of said wire;
   said wire having a closed eyelet at the other end of said wire.

2. A fish attracting pellet as set forth in claim 1, further comprising:
   a length of malleable, deformable wire embedded and secured at its midportion within said aperture and extending in either direction therefrom;
   said wire adapted to be deformably wrapped around the fishing line to releasably secure said pellet thereto.

3. A fish attracting pellet as set forth in claim 1, further comprising:
   a flange, integral with, and outwardly extending transversely from said pellet;
   said flange adapted to outwardly disburse said dissolved fish attractant material into the water when said pellet on the fishing line is displaced.

4. A fish attracting pellet as set forth in claim 1, further comprising:
   an arrangement of first and second fins integral with and outwardly extending from said pellet;
   said first fin longitudinally disposed to inhibit spinning of said pellet on the fishing line as it is displaced through the water;
   said second fin diagonally disposed to disburse said dissolved fish attractant material in the water when said pellet is displaced through the water.

5. A fish attracting pellet as set forth in claim 4, further comprising:
   a third fin diagonally disposed divergent to said second fin for enhanced disbursement of said dissolved fish attractant material in the water when said pellet on the fishing line is pulled in either direction through the water.

6. A fish attracting pellet as set forth in claim 1, further comprising:
   a flange integral with, and outwardly extending transversely from said pellet;
   said flange adapted to outwardly disburse said dissolved fish attractant material into the water when said pellet on the fishing line is displaced.

7. A fish attracting pellet adapted to be interconnectable to a fishing line, said pellet comprising:
   a main body formed of a solidified and scented fish attractant material which is soluble and slowly dissolvable in water;
   a fishing line attaching plate embedded and secured at one end within said pellet;
   said plate other end having structure adapted to receive and secure a bight of fishing line thereto.

8. A fish attracting pellet as set forth in claim 7, wherein said plate further comprises:
   a tab laterally disposed and extending from said plate one end and said pellet outer surface;
   said tab for disbursing said dissolved fish attractant material when said pellet on said fishing line is displaced.

9. A fish attracting pellet as set forth in claim 1, wherein:
   said material main body is inert porous material for absorbingly receiving fish attractant pastes and liquids which are thereafter slowly disbursed into water.

10. A fish attracting pellet as set forth in claim 7, wherein:
    said material main body is inert porous material for absorbingly receiving fish attractant pastes and liquids which are thereafter slowly disbursed into water.

11. A fish attracting pellet as set forth in claim 6, wherein:
    said material main body is inert porous material for absorbingly receiving fish attractant pastes and liquids which are thereafter slowly disbursed into water.

12. A fish attracting pellet as set forth in claim 5, wherein:
    said material main body is inert porous material for absorbingly receiving fish attractant pastes and liquids which ar thereafter slowly disbursed into water.

13. A fish attracting pellet interconnectable to a fishing line, said pellet comprising:
an elongated main body formed of solidified and scented fish attractant material which is soluble and slowly dissolvable in water;
said main body having a longitudinal aperture therethrough to receive a fishing line passed therethrough;
a longitudinally disposed first groove laterally extending from said aperture to said pellet outer surface;
said first groove also adapted to receive the fishing line therein;
a hole laterally extending from said aperture away from said first groove to said pellet outer surface;
said hole adapted to receive a bight of the fishing line passed therethrough;
a diagonally disposed second groove inwardly extending from said pellet outer surface toward said first groove;
said second groove adapted to receive the fishing line bight after it is passed through said hole for securing said pellet in place on the fishing line when the fishing line is pulled taught for use.

* * * * *